United States Patent [19]
Schwartz

[11] 3,830,431
[45] Aug. 20, 1974

[54] ABATING EXHAUST NOISES IN JET ENGINES
[75] Inventor: Ira R. Schwartz, Menlo Park, Calif.
[73] Assignee: The United States of America as represented by the Administrator of the National Aeronautics and Space Administration, Washington, D.C.
[22] Filed: Mar. 23, 1973
[21] Appl. No.: 344,410

[52] U.S. Cl. ...................... 239/265.11, 181/33 HC
[51] Int. Cl. ............................................. F01n 1/08
[58] Field of Search..... 239/265.13, 265.19, 265.11; 181/33 HC, 33 HD, 51

[56] References Cited
UNITED STATES PATENTS
3,153,319  10/1964  Young et al. ................. 239/265.13
3,550,721  12/1970  Bruner................................ 181/51
3,583,640  6/1971  MacDonald .................. 239/265.13
3,613,827  10/1971  Labussiere................. 239/265.13 X
3,710,890  1/1973  True et al...................... 181/33 HC Primary Examiner—M. Henson Wood, Jr.
Assistant Examiner—Michael Y. Mar
Attorney, Agent, or Firm—Darrell G. Brekke; Armand G. Morin, Sr.; John R. Manning

[57] ABSTRACT

A noise abating improvement for jet engines including the provision of apparatus in the primary flow stream of gas turbine engines such as turbojet, turbofan, turboprop, and other jet engines such as ram jets, scram jets and hybrid jet engines, or in either the primary and/or secondary flow streams of turbofan engines or the like, for imparting to the exhaust gases a component rotation or swirl about the engine's longitudinal axis. The rotary component in the exhaust gases has the effect of substantially suppressing the build up on sound energy normally produced by an axial flow exhaust system.

25 Claims, 22 Drawing Figures

Fig_6

Fig_7

Fig_8

Fig_9

Fig_10

Fig_11

Fig_12

Fig_13

Fig_14

Fig_15

Fig_16

Fig_17  Fig_18

Fig_19  Fig_20

ABATING EXHAUST NOISES IN JET ENGINES

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates generally to that class of motive power sources commonly referred to as "jet engines" and more particularly to improvements to such engines for reducing the noise generated by the turbulent intermixing of the exhaust gases with the ambient atmosphere.

2. Description of the Prior Art

The noise problem surrounding the use of jet engines is not a recent one and has been the subject of substantial research since at least the early 1950's when pioneer studies were conducted by the British. Later, the United States aircraft and engine industry, together with NACA, the predecessor of NASA, engaged in an extensive program with the same objective. The later program resulted in the use of multi-tubed nozzles which later developed into more complicated nozzles used in combination with ejector shrouds. The phenomenal growth of air traffic in the early 1960's intensified the noise problem and finally the President, in 1966, directed appropriate government agencies to plan and then implement programs for noise abatement.

These programs have indicated that there are three primary sources of engine noise in modern jet engines. The sources are the noise which is emitted from the intake passage, the noise which is emitted from the fan discharge duct, the noise emitted from the primary jet exhaust. The noise which is emitted from the inlet and from the fan discharge duct is generated primarily by the fan and to a lesser extent by the compressor. The noise emitted by the primary jet at the rear of the engine is generated by the turbulent mixing of the jet with the surrounding air and it is this mixing noise which is responsible for the tremendous roar associated with jet airplanes. See 1972 Lewis Research Center proceedings on Aircraft Engine Noise Reduction, NASA SP-311.

Prior art efforts at noise suppression have primarily been directed toward (1) the use of higher bypass ratio engines which give more thrust and movement of large masses of air at low exhaust velocity, (2) the use of wider spacing of the moving parts of the fan from the stationary parts such as the vane blades, and even eliminating completely inlet guide vanes, and (3) the use of sound absorbing materials to either absorb the noise energy in situ or block it from getting out of the engine. For example see the U.S. Pats. to Duthion et al., No. 3,436,020, Langston, No. 3,463,402, Duval, No. 3,524,588, WOLF et al., No. 3,587,973, Medawar et al., No. 3,591,085, and Weed, No. 3,667,680.

These attempts at solution of the problem are only partially effective, however since a major source of objectionable noise is that produced by the exhaust gases as they mix with the atmosphere. Consequently, new noise reduction techniques must be developed which deal primarily with exhaust flow treatment.

SUMMARY OF THE PRESENT INVENTION

It is therefore a primary object of the present invention to provide improvements in the handling of jet engine exhaust flows which result in substantial reduction of noise generated by the jet exhaust.

Still another object of the present invention is to accomplish the previously stated objectives by providing means for imparting rotary motion to the jet exhaust stream so as to reduce the sonic energy generated by the turbulent mixing of hot exhaust gases with the atmosphere.

Briefly, the present invention is directed toward a noise abating improvement for jet engines and includes the provision of means such as radial vane structures, or movable wall casings, or primary/secondary exhaust flow intercommunication passages for imparting rotary motion to the expanding primary and/or secondary exhaust gas streams prior to their emission from the engine structure, per se, so that the effective velocity differential between the exhaust gases and the ambient atmospheric gases is reduced.

Perhaps the principal advantage of the present invention is that it provides substantial noise reduction by means which can be retrofitted into present engines without requiring substantial redesign.

Another advantage of the present invention is that substantial reductions in emitted sound from the exhaust jet can be obtained without proportionate loss in engine efficiency.

These and other objects and advantages of the present invention will no doubt become apparent to those of ordinary skill in the art after having read the following detailed description of the preferred embodiments which are illustrated in the several figures of the drawings.

DETAILED DESCRIPTION OF THE PREFERRED EMBODIMENTS

Figure 1:
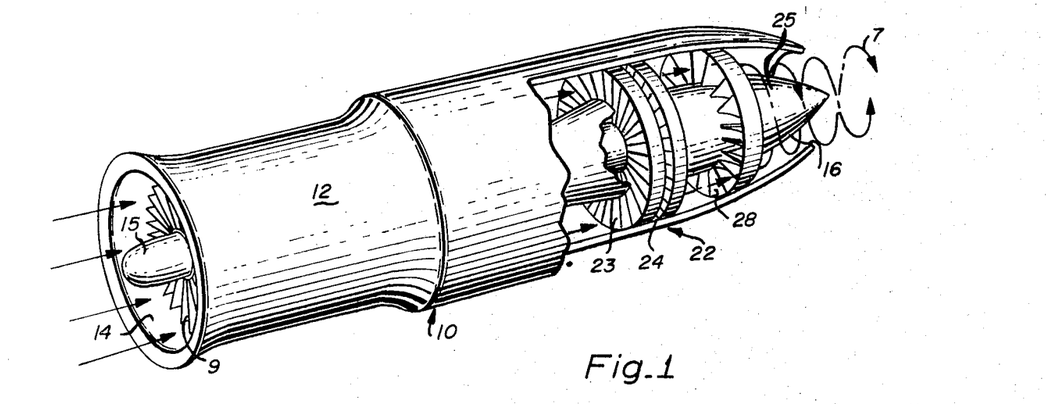
FIG. 1 is a partially broken schematic illustration of a turbojet engine modified to include exhaust noise reduction means in accordance with the present invention.
Figure 2:
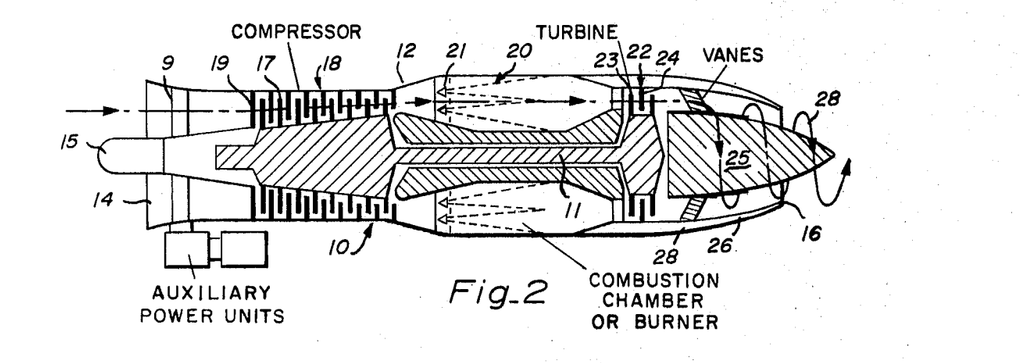
FIG. 2 is a longitudinal cross-section taken along the axis of the engine shown in FIG. 1 of the drawing.

Referring now to the drawings, a jet engine 10 is shown in FIG. 1 in partially broken perspective and in longitudinal cross-section in FIG. 2. As in conventional axial flow turbojet engines, engine 10 includes a generally cylindrical casing 12, one end of which forms an air intake passage 14 and the other end of which forms a jet exhaust passage 16. Engine 10 further includes an inlet spinner 15, intake guide vanes 9, a compressor section 18 including rotor blades 17 and stator blades 19, a burner or combustion section 20 including fuel injectors 21 for injecting fuel into the highly compressed air flow in the combustion chambers, a turbine section 22 including rotor blades 23 and stator blades 24, a tailcone 25, and an exhaust nozzle 26.

The principal difference between the illustrated engine and conventional jet propulsion engines is that in the latter, the primary gas flow from the last stage of the turbine section 22 exits the exhaust nozzle 24 in an axial flow direction, i.e., with the combustion products flowing in a direction generally parallel to the axis of the engine. This is normally true no matter whether the engine is a turbojet, turboprop, turbofan, turboram jet, ram jet, scram jet, pulse jet or the like. In fact, in those turbine type engines in which there would otherwise be a tendency for a non-axial flow, stator blades such as those shown at 24 are usually designed to insure such axial flow.

In the above-mentioned types of engines, with the exception of the turboprop, the primary power and thrust is obtained through combustion and exhaust of the burning fuel. However, as the combustion products escape from the engine exhaust nozzle at high velocity, the turbulent mixing of the hot exhaust gases with the atmospheric gases gives rise to the jet roar and deep rumble which is characteristic of state-of-the-art jet engines. For most axial flow systems, the level of noise generated as the combustion products exit through the exhaust nozzle is very high and in most cases is unacceptable. Therefore, in order to reduce the exhaust noise in accordance with the present invention, a set of flow directing vanes 28 are mounted in the aft section usually near the exhaust opening of the engine so as to impart a swirling or rotating motion to the exhaust gases as they pass therethrough for subsequent discharge through the exhaust passage 16. The vanes 28 are preferably radially oriented about the engine axis and are of a configuration suitable for deflecting the flow with as little flow impedance as possible.

Rotating or swirling the fluid flow either by vanes, tangential injection of fluid flow with respect to the longitudinal axis of the duct or by rotating the flow chamber walls, produces centrifugal forces and flow instabilities in the flow that modify or decrease the turbulent pressure fluctuations and increase turbulent mixing in the jet and hence decrease the noise level and the far field accoustic power output of the jet. The effect of swirl on noise generation in an exhaust jet increases (noise reduction increases) as the temperature in the jet increases above ambient temperature, as the density of the exhaust gases increase, and as the rotational pressure gradients increase (angle of swirl increases). The optimum angle of flow rotation or swirl required for maximum jet noise reduction is determined by the design and operating characteristics of the engine components ahead of the exhaust nozzle exit, aerodynamic and thermodynamic characteristics of the jet exhaust, velocity, temperature, pressure and density profiles, and flow interactions between the primary jet exhaust and secondary exhaust flows or external ambient air entrainment into the jet exhaust.

Rotating or swirling angles of flow of up to approximately 75 degrees (with respect to the longitudinal axis of the engine) are amenable for significant reductions in noise depending upon the particular engine component design and engine operation.

Swirling flow does not result in a material reduction in power output for numerous reasons. The total pressure loss is minimal for average swirl angles, and flow near the chamber walls is stabilized. The mass and momentum contributions to the power output are not appreciably affected by the swirl angle of the flow, provided the swirl angle is not very large. Pressure losses due to greater turbulent mixing are not excessive. When the swirling flow is applied to an engine having an afterburner, the power output is greater as a result of the increased mixing rates of the combustible mixture, and hence, increased combustion efficiency. Thus, the combustion chamber required with rotating flow is shorter compared to axial flow burning. Engine power output is a function of weight and size. Meaningful engine performance parameters are power output/frontal area, power output/pounds of fuel consumption, and power output/specific weight. An engine made in accordance with the subject invention is not as long as a conventional engine and the small pressure losses that might be incurred due to swirling flow are counterbalanced by weight and size reductions which results in improved overall aircraft and engine performance.

Figure 3:
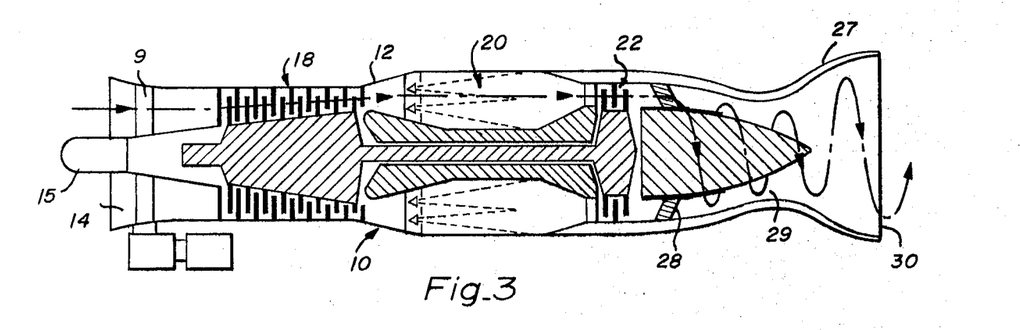
FIG. 3 is a longitudinal cross-section taken along the axis of a turbojet engine modified for supersonic applications.

Referring now to FIG. 3 of the drawings, a turbojet modified in accordance with the present invention but having a converging-diverging nozzle 27 is shown. Like numbers in this and subsequent figures will refer to like parts of previous figures. It is well known that for propulsion systems in which the working fluid pressure is high compared to the ambient pressure, a converging-diverging nozzle must be used. In other words, whereas for subsonic flight applications, a converging nozzle is normally used, for supersonic flight a converging-diverging nozzle is typically used. In the converging-diverging nozzle the working fluid continues to expand from the critical throat pressure at 29 to the ambient pressure at the exhaust opening 30 with a further increase in velocity beyond the sonic throat velocity. In accordance with the present invention and as in the previously described embodiment, the vanes 28 cause the gases within the nozzle to continue to swirl, rotating about the engine axis as they pass through the diverging, then the converging portions of nozzle 27 and ultimately exit through the exhaust passage 30.

Figure 4:
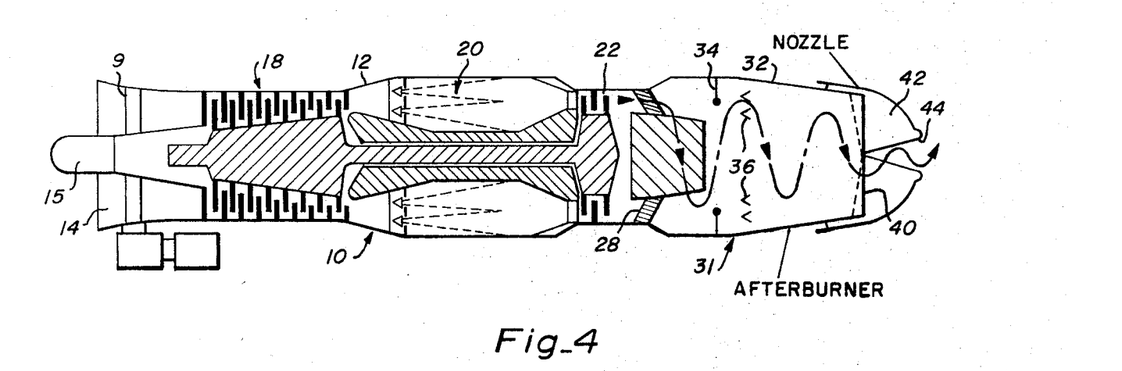
FIG. 4 is a longitudinal cross-section schematically illustrating an after-burner equipped turbojet engine modified in accordance with the present invention.

In FIG. 4 of the drawings another embodiment of the present invention is shown in the form of a turbojet engine having a thrust augmenting after-burner 31 disposed downstream of the vanes 28. After-burner 31 includes a generally cylindrical tailpipe duct 32 which forms an after-burning chamber into which fuel is injected through injectors 34. Suitable flame holder structures 36 are provided downstream of the injectors 34 to produce small eddies in the gas stream which promote stable burning. Exhaust passage 40 is provided with a variable nozzle structure 42 which enables the dimensions of the exhaust passage to be modified to suit flight and power requirements.

As in the previously described non-augmented turbojet embodiments, vanes 28 are provided upstream of the after-burner 31 to cause the hot gases flowing through turbine stage 22 to assume a swirling or spiraling flow pattern as they enter after-burner 31. This aids in the mixing of fuel in the after-burner section and causes the exhaust gases to continue to swirl as they exit through the exhaust passage 44. Swirling of the primary gas flow in the after-burner will greatly reduce the internal sonic energy which would otherwise be generated by the device and will significantly reduce pressure fluctuations, pulsations and nozzle exhaust noise.

Figure 5:
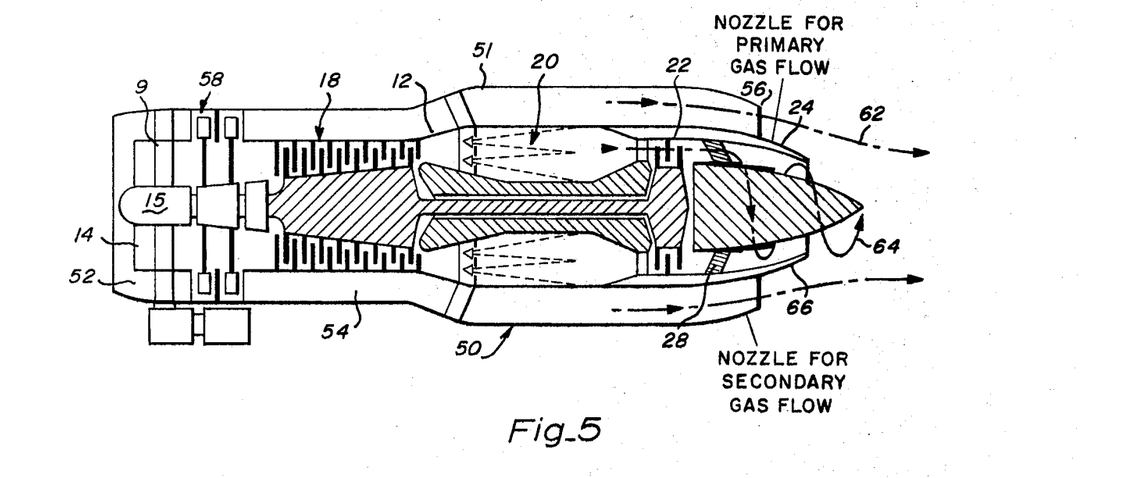
FIG. 5 is a longitudinal cross-section schematically illustrating a turbofan bypass jet engine modified in accordance with the present invention.

In yet another embodiment of the present invention shown schematically in FIG. 5, vanes 28 are disposed in the primary gas flow path of a turbofan bypass jet engine 50 which, in addition to including an intake passage 14, a primary compressor stage 18, combustion chambers 20, turbine stage 22 and exhaust nozzle 24 as in the previous embodiment, also includes an outer cylindrical cowling 51 which cooperates with the inner engine casing 12 to provide a cylindrical bypass flow path 54 for air drawn in through the bypass intake passage 52 and exhausted through the bypass exhaust nozzle 56. A fan section 58 that is also driven by turbine 22 increases the volume and pressure of secondary air drawn in through intake 52.

As indicated by the flow arrow 64, the vanes 28 will impart a generally helical trajectory to hot primary gases as they expand in passing through exhaust nozzle 66 but the bypass or secondary flow gases indicated by arrow 62 will follow their normal axial path until influenced by the swirling primary gas flow. The interaction between the flowing streams of primary gases and secondary gases will have the effect of substantially reducing the noise which would otherwise be generated in the absence of the rotary exhaust flow.

Figure 6:
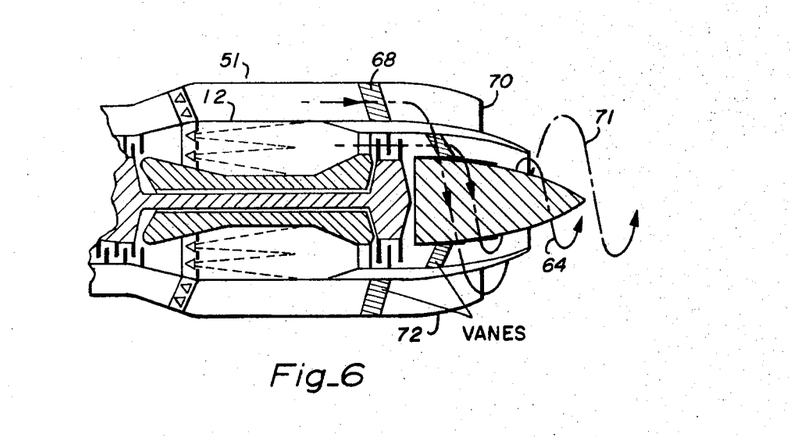
FIG. 6 is a longitudinal cross-section schematically illustrating a turbofan bypass jet engine modified in accordance with another alternative embodiment of the present invention.

In the partial section shown in FIG. 6 of the drawings, the turbofan bypass engine of FIG. 5 has been modified to further include vanes 68 disposed radially within the annular bypass chamber formed between casing 12 and cowling 51. Vanes 68 impart rotary motion, as indicated by arrow 71, to the bypass gases developed within the bypass chamber as they approach secondary exhaust flow passage 70 of exhaust nozzle 72.

Figure 7:
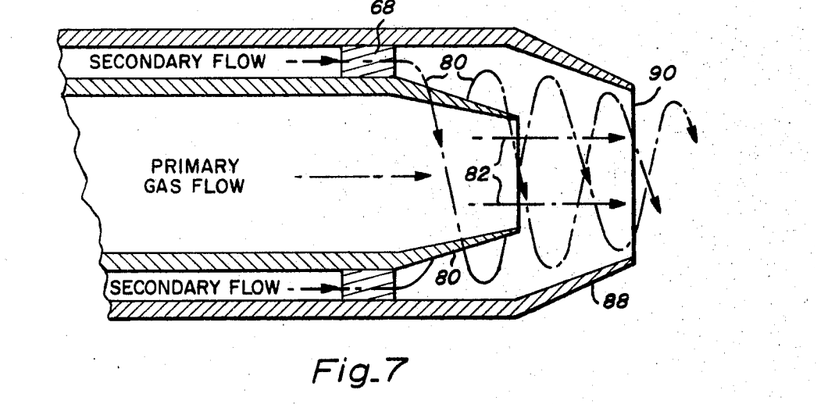
FIGS. 7 to 22 are simplified schematic illustrations showing tail sections of jet engines modified in accordance with further embodiments of the present invention.

Still other modifications of the present invention will now be discussed using the more simplified schematic partial diagrams and cross-sectional diagrams shown in the remaining figures. In FIG. 7, vanes 68 are provided in the bypass chamber for imparting rotary motion to the secondary gas flow indicated by arrows 80, but no vanes are provided in the primary flow stream which is allowed to continue out of the primary nozzle 80 in the axial flow direction indicated by the arrows 82. As the primary gases and secondary gases mix in the nozzle 88 and pass through exhaust opening 90 sound generating sources are kept to a minimum even though the thrust generated remains essentially the same as it would have been in the absence of vanes 68.

Figure 8:
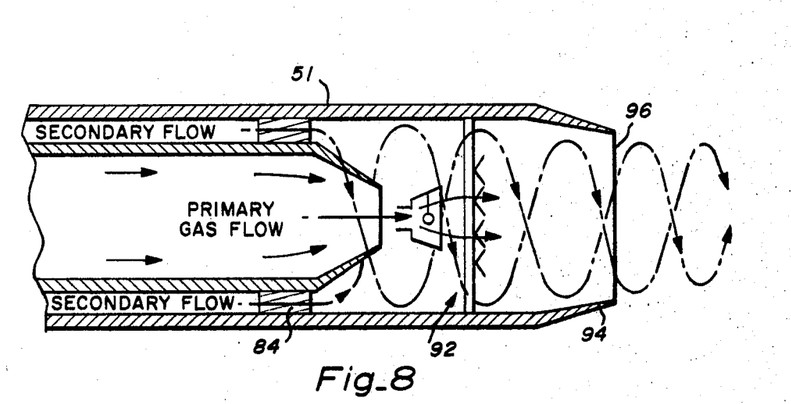

In FIG. 8 of the drawings a similar embodiment is shown which further includes an afterburner section 92 added within an extension of the cowling 51. The secondary gas flow is rotated by the vanes 84 of the secondary flow duct ahead of the afterburner 92 to induce a swirling component in the partial primary and secondary flow mixture which thereafter causes a swirling action in the augmented primary gases developed by the afterburner 92 within the exhaust nozzle 94. As a result the exhaust gases emitted from the exhaust orifice 96 will have a swirl imparted to them which tends to reduce the sound levels which would otherwise be generated as the exhaust gases are emitted from the engine.

Figure 9:
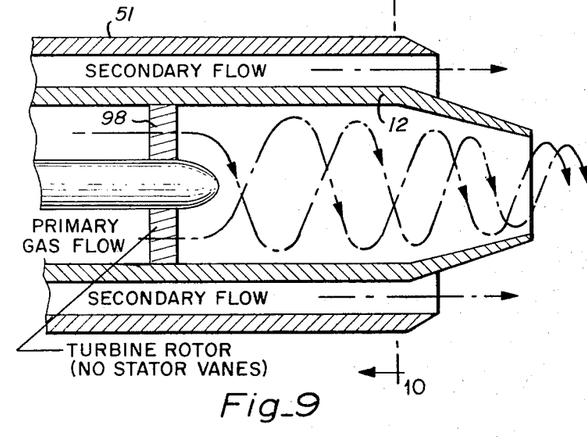
Figure 10:
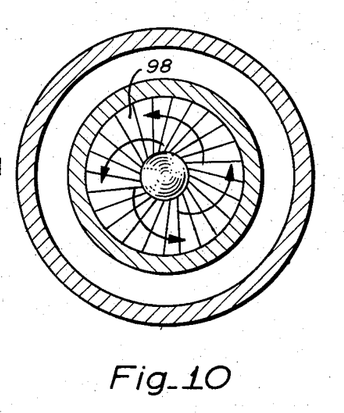

Still another method of imparting rotary motion to the primary gas flow is suggested in FIGS. 9 and 10. In this embodiment, which is perhaps the simplest case, the stator vanes are removed from the last stage of the turbine causing the exhaust gases passed therethrough to retain the rotary motion resulting from their energy exchange with the turbine wheel 98. This feature could of course be combined with flow directing vanes disposed in either or both of the primary or secondary flow paths to achieve improved flow rotation.

Figure 11:
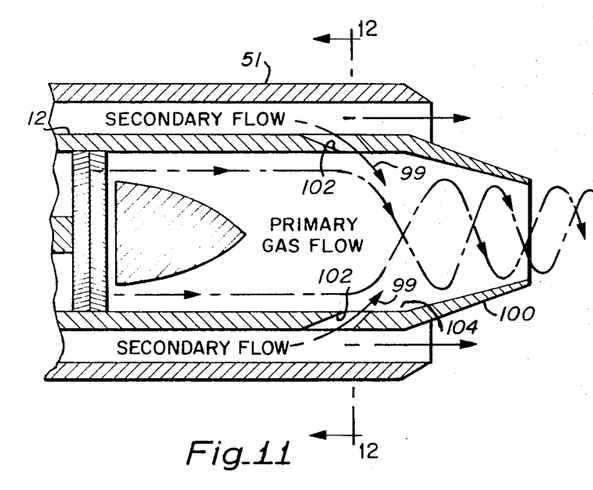
Figure 12:
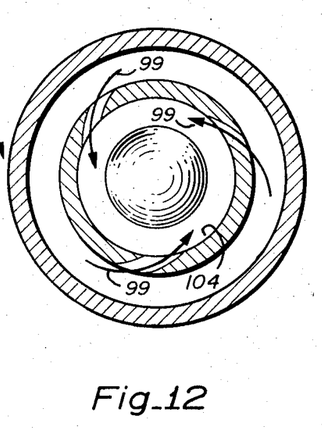

The method illustrated in FIGS. 11 and 12 may also be used to introduce a rotary component to primary gas flow. In this method a portion of the secondary gas flow in the outer annular flow chamber is bled off as indicated by the arrows 99 and allowed to enter the primary gas flow in a swirling rotating manner aft of the last turbine stage but ahead of the exhaust nozzle 100. This is accomplished by providing slots 102 in the casing 12 that are more or less tangentially oriented with respect to the inner wall surface 104 forming the primary gas flow chamber. The angle of swirl and the size of the slots 102 may vary depending upon the size and geometry of the primary gas flow chamber, the size and geometry of the exhaust nozzle, and the thermodynamic and flow characteristics of the primary gas flow.

Figure 13:
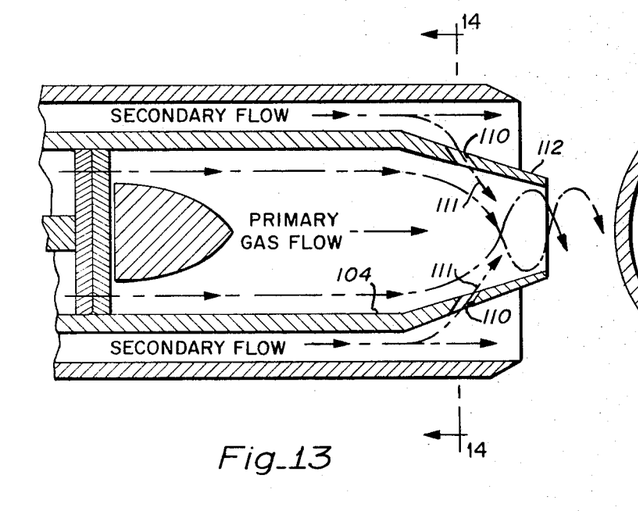
Figure 14:
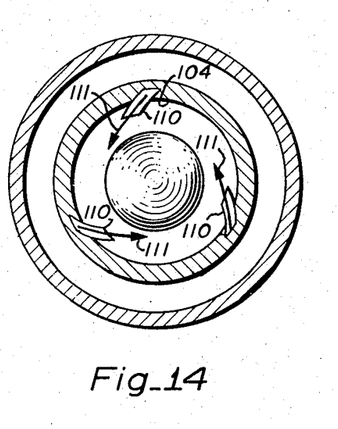

A related, similar method of imparting rotary energy to the primary gas flow is illustrated in FIGS. 13 and 14 wherein slots 110 are provided in the nozzle wall 112. As in the previous embodiment, the slots are tangentially oriented relative to the curvature of the primary nozzle inner wall 104 for admitting jets of secondary flow as illustrated by arrows 111. The angle of swirl and the size of the slots 110 may vary as in the previous embodiment.

Figure 15:
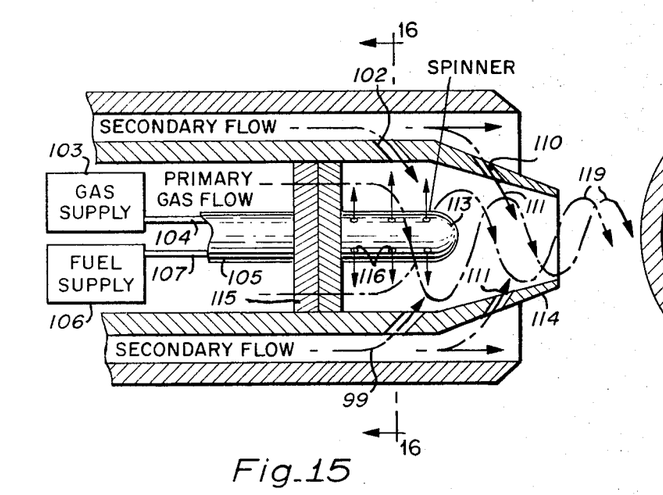
Figure 16:
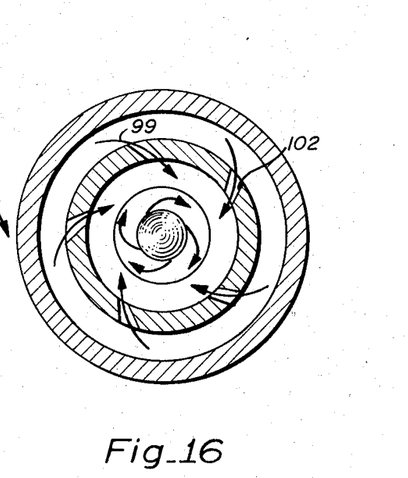

In FIGS. 15 and 16, a combination of slots 102 and 110 illustrated in the embodiments of FIGS. 11 to 14 are included along with a rotating spinner 113 disposed aft of the last turbine stage but ahead of exhaust nozzle 114. Spinner 113 is driven by a turbine wheel 115 and is provided with a plurality of apertures 116 which inject air, a gas, or gases, as indicated by arrows 117, in a swirling manner into the primary chamber as it revolves about the longitudinal axis of engine. The air or gases may, for example, be routed from gas supply 103 via conduit 104 within turbine shaft 105. In the event that afterburning is also desired, fuel from fuel supply 106 is fed to spinner 113 via conduit 107 for mixing with the air or gases from supply 103. Alternatively, spinner 113 may be fixed in position with apertures 116 being configured in the form of slots or the like which are tangentially oriented relative to the curvature of the outer surface of the spinner so that injection into the chamber imparts rotary motion to the primary gas flow.

Figure 17:
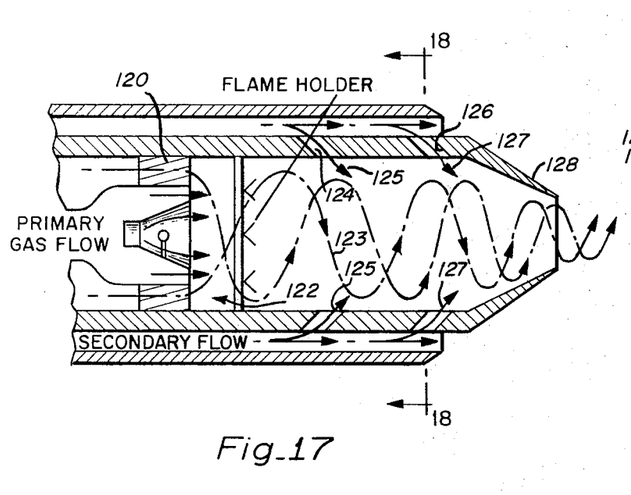
Figure 18:
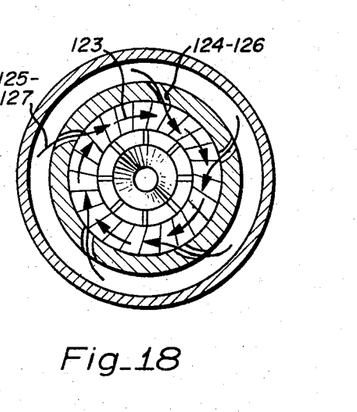

In FIGS. 17 and 18, a still further combination of the previously described elements is suggested wherein vanes 120 as positioned about an after-burner 122 to swirl a portion of the primary gas flow as shown by arrows 123, and ram bypass air is injected into the primary flow chamber through tangentially oriented wall slots 124 and 126 ahead of nozzle 128 to impart further rotary energy to the augmented primary flow stream. As in the immediately previous embodiments, the secondary flow streams continue to flow axially as they are exhausted from the engine.

Figure 19:
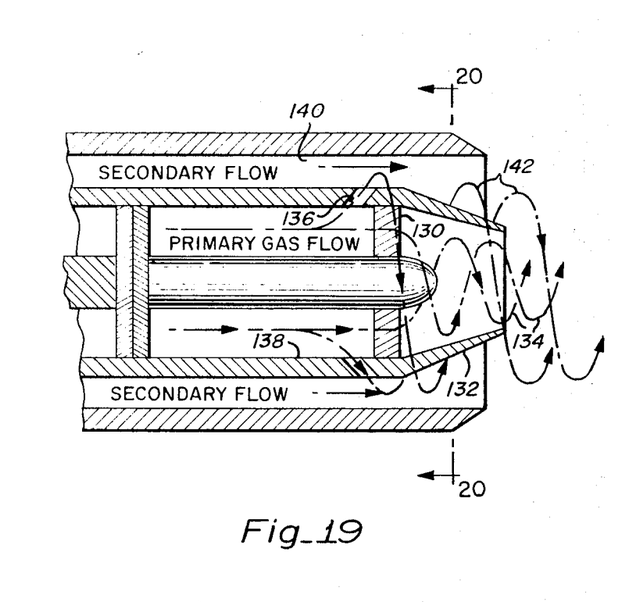
Figure 20:
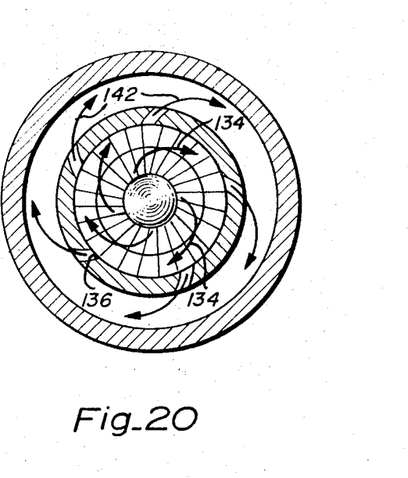

In the embodiment shown in FIGS. 19 and 20, vanes 130 are provided in the primary gas flow path ahead of nozzle 132 to impart rotary motion to the primary gas flow as indicated by the arrows 134, and slots 136 which are tangentially oriented relative to the curvature of the primary gas flow chamber walls 138 are provided upstream of vanes 130 to bleed off primary gas for introduction into the secondary gas flow to introduce a rotational component thereto. As the primary gas passes through slots 136 and into the secondary flow chamber 140 it will cause a swirl to be imparted to the secondary gas flow as illustrated by the arrows 142.

Figure 21:
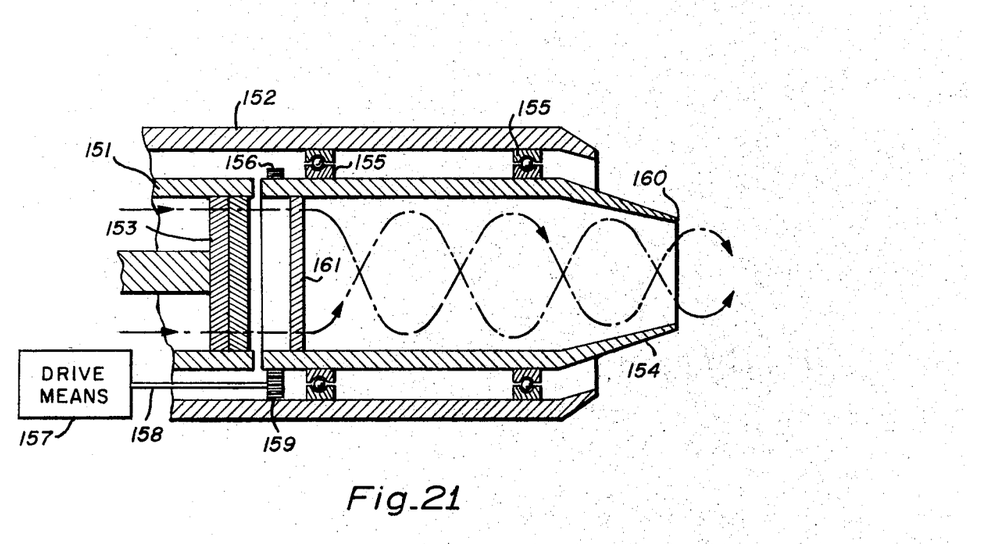

Still another method of imparting swirling gas flow is illustrated in FIG. 21. Swirling flow is generated within a rotating wall casing section 154. Upstream of turbine 153, the gas flow is contained within inner wall 151 which is surrounded by outer wall 152. Downstream from turbine 153, exhaust chamber casing section 154 is supported by bearings 155. Spur gear 156 is fastened to the outer perimeter of casing section 154. Rotary motion is imparted to the casing section by drive means 157 via shaft 158 and spur gear 159. The rotation of casing section 154 creates a rotating viscous shear layer near the wall which results in a swirling gas flow from outlet 160. If desired, vanes 161 may be affixed to the interior of casing section 154 to further enhance the swirling action in the entire chamber. The vanes may extend all the way across the exhaust chamber or they may be shorter than the radial dimension of the chamber. Additionally, multiple vanes may be dispersed along the length of the chamber.

Figure 22:
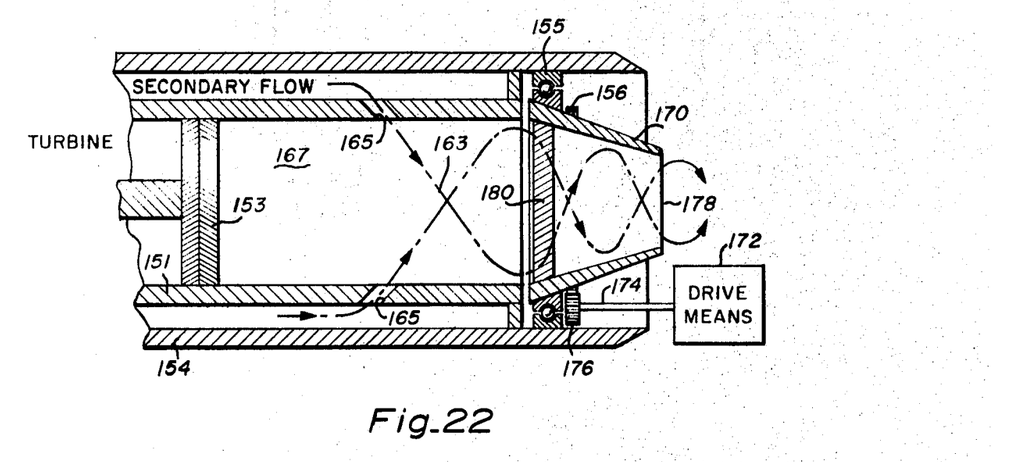

In still another embodiment depicted in FIG. 22, secondary gas flow is channeled through a rotating nozzle 170. Inner wall 151 and outer wall 154 form a passageway for secondary flow 163. Tangentially-oriented wall slots 165 admit the secondary flow to chamber 167 downstream of turbine 153. Converging nozzle 170 is supported by and free to rotate on bearing 155. A spur gear 156 is affixed to the perimeter of nozzle 170 and rotary motion is imparted to nozzle 170 by drive means 172 via shaft 174 and spur gear 176. Swirling flow is exhausted from outlet 178 as a result of the combination of secondary flow and primary flow in chamber 167, the rotation of nozzle 170, and the rotation of vanes 180 within nozzle 170.

Although numerous methods and structures and various combinations thereof may be used to impart rotary motion to jet exhaust in accordance with the present invention, it will be appreciated that the primary function and objective of such means is to cause the exhaust gases to commence rotation about the engine axis prior to their exit through the engine exhaust passages. Introduction of such rotational swirl at an effective angle relative to the axis of the engine and before the gases are allowed to exit from the exhaust nozzle eliminates the need to provide inefficient prior art noise suppressors within the exhaust nozzles. As a result, the thrust losses, weight penalties and other disadvantages associated with the prior art noise suppressors are obviated. The present invention also permits the elimination of acoustically treated wall liners in the exhaust ducts and nozzles, thus reducing weight and associated flow losses in addition to obtaining large reductions in the radiated noise level.

Whereas many alterations and modifications of the present invention will no doubt become apparent to the person of ordinary skill in the art after having read the foregoing description, it is to be understood that the particular embodiments are shown and described by way of illustration only and are in no way intended to be considered limiting. Accordingly, it is intended that the appended claims be interpreted as covering all such alterations and modifications as fall within the true spirit and scope of the invention.

What is claimed is:

1. In a jet engine including a generally cylindrical casing having means forming an air intake passage at one end and an exhaust passage at the opposite end, and means disposed within said casing between said intake passage and said exhaust passage for mixing intake air with a combustible fuel and for igniting the mixture to develop a continuous stream of primary combustion products for discharge through said exhaust passage, the improvement comprising:

flow directing means disposed within said casing between said mixing/igniting means and said exhaust passage for imparting motion concentric with said exhaust passage to said stream of primary combustion products before it reaches said exhaust passage, including a converging nozzle portion forming said exhaust passage.

2. In a jet engine including a generally cylindrical casing having means forming an air intake passage at one end and an exhaust passage at the opposite end, and means disposed within said casing between said intake passage and said exhaust passage for mixing intake air with a combustible fuel and for igniting the mixture to develop a continuous stream of primary combustion products for discharge through said exhaust passage, the improvement comprising:

flow directing means disposed within said casing between said mixing/igniting means and said exhaust passage for imparting motion concentric with said exhaust passage to said stream of primary combustion products before it reaches said exhaust passage, said flow directing means including a plurality of vanes disposed radially about the axis of said casing, said vanes being oriented to deflect said combustion products at an angle relative to said axis, and thrust augmenting means disposed within said casing between said flow directing means and said exhaust passage.

3. In a jet engine including a generally cylindrical casing having means forming an air intake passage at one end and an exhaust passage at the opposite end, and means disposed within said casing between said intake passage and said exhaust passage for mixing intake air with a combustible fuel and for igniting the mixture to develop a continuous stream of primary combustion products for discharge through said exhaust passage, the improvement comprising:

flow directing means disposed within said casing between said mixing/igniting means and said exhaust passage for imparting motion concentric with said exhaust passage to said stream of primary combustion products before it reaches said exhaust passage, a generally cylindrical cowling disposed concentric with said casing and cooperating therewith to define an annular flow passage beginning proximate said intake passage and terminating proximate said exhaust passage, and means forming tangentially oriented passageways through said casing for communicating said annular flow passage with said exhaust passage, whereby air flowing within said annular flow passage is diverted into said exhaust passage at an angle relative to the direction of flow of said primary combustion products so as to impart a component of rotation thereto.

4. In a jet engine as recited in claim 3 and further including means for imparting rotary motion concentric with said annular flow passage to said stream of secondary air.

5. In a jet engine as recited in claim 4 wherein said means for imparting rotary motion to said stream of secondary air includes a plurality of vanes disposed within said annular flow passage, said vanes being oriented to deflect said air at an angle relative to said axis.

6. In a jet engine as recited in claim 4 wherein said means for imparting rotary motion to said stream of secondary air includes means forming tangentially oriented passageways through said casing proximate said exhaust passage for communicating said primary combustion products with said secondary air.

7. In a jet engine as recited in claim 6 wherein said passageways are formed in said casing upstream of said flow directing means.

8. In a jet engine including a generally cylindrical casing having means forming an air intake passage at one end and an exhaust passage at the opposite end, and means disposed within said casing between said intake passage and said exhaust passage for mixing intake air with a combustible fuel for igniting the mixture to develop a continuous stream of primary combustion products for discharge through said exhaust passage, the improvement comprising:

flow directing means disposed within said casing between said mixing/igniting means and said exhaust passage for imparting motion concentric with said exhaust passage to said stream of primary combustion products before it reaches said exhaust passage, a generally cylindrical cowling disposed concentric with said casing and cooperating therewith to define an annular flow passage beginning proximate said intake passage and terminating proximate said exhaust passage, and an air or gas injecting turbine-driven spinner for injecting air or gas into said stream of primary combustion products.

9. In a jet engine as recited in claim 8 and further including means forming tangentially oriented passageways through said casing for communicating said annular flow passage with said exhaust passage, whereby air flowing within said annular flow passage is diverted into said exhaust passage at an angle relative to the direction of flow of said primary combustion products so as to impart a component of rotation thereto.

10. In a jet engine as recited in claim 9 wherein said cowling extends beyond said exhaust passage to provide an exhaust duct wherein said streams of primary and secondary flows are allowed to combine.

11. In a jet engine as recited in claim 10 and further including thrust augmenting means disposed within said exhaust duct.

12. In a jet engine including a generally cylindrical casing having means forming an air intake passage at one end and an exhaust passage at the opposite end, and means disposed within said casing between said intake passage and said exhaust passage for mixing intake air with a combustible fuel and for igniting the mixture to develop a continuous stream of primary combustion products for discharge through said exhaust passage, the improvement comprising:

flow directing means disposed within said casing between said mixing/igniting means and said exhaust passage for imparting motion concentric with said exhaust passage to said stream of primary combustion products before it reaches said exhaust passage, a generally cylindrical cowling disposed concentric with said casing and cooperating therewith to define an annular flow passage beginning proximate said intake passage and terminating proximate said exhaust passage, and thrust augmenting means disposed within said exhaust duct.

13. In a jet engine including a generally cylindrical casing having means forming an air intake passage at one end and an exhaust passage at the opposite end, and means disposed within said casing between said intake passage and said exhaust passage for mixing intake air with a combustible fuel and for igniting the mixture to develop a continuous stream of primary combustion products for discharge through said exhaust passage, the improvement comprising:

flow directing means disposed within said casing between said mixing/igniting means and said exhaust passage for imparting motion concentric with said exhaust passage to said stream of primary combustion products before it reaches said exhaust passage, said exhaust passage including a casing section separate from the main engine casing, said casing section being mounted to rotate about its axis to create a viscous shear layer near its inner wall tending to develop a swirling action in said stream as it passes therethrough.

14. In a jet engine as recited in claim 13 wherein said flow directing means is affixed to the upstream end of said casing section and rotates therewith.

15. In a jet engine including a generally cylindrical casing having means forming an air intake passage at one end and an exhaust passage at the opposite end, and means disposed within said casing between said intake passage and said exhaust passage for mixing intake air with a combustible fuel and for igniting the mixture to develop a continuous stream of primary combustion products for discharge through said exhaust passage, the improvement comprising:

flow directing means disposed within said casing between said mixing/igniting means and said exhaust passage for imparting motion concentric with said exhaust passage to said stream of primary combustion products before it reaches said exhaust passage, said casing including a separated converging nozzle portion, and means for causing said nozzle portion to rotate about its axis and create a viscous shear near its inner wall tending to develop a swirling action in said stream as it passes therethrough.

16. In a jet engine as recited in claim 15 and further including a generally cylindrical cowling disposed concentric with said casing and cooperating therewith to define an annular flow passage beginning proximate said intake passage and terminating proximate said exhaust passage, said main engine casing including means forming tangentially oriented passageways therethrough for communicating said annular flow passage with said exhaust passage whereby air flowing within said annular flow passage is diverted into said exhaust at an angle relative to the direction of flow of said primary combustion products for imparting a component of rotation thereto before they pass through said nozzle portion.

17. In a jet engine including a generally cylindrical casing forming a primary air intake passage at one end and a primary exhaust passage at the opposite end, and means disposed within said casing between said primary intake passage and said primary exhaust passage for mixing intake air with a combustible fuel and igniting the mixture to develop a continuous stream of primary combustion products for discharge through said primary exhaust passage, and a generally cylindrical cowling disposed concentric with said casing and cooperating therewith to define an annular flow passage beginning proximate said intake passage and terminating proximate said exhaust passage, the improvement comprising:

secondary flow directing means disposed within said annular flow passage for imparting rotary motion concentric with said annular flow passage to bypass air flowing therethrough.

18. In a jet engine as recited in claim 17 wherein said cowling extends beyond said exhaust passage to provide an exhaust duct wherein said stream of primary combustion products said bypass air are allowed to intermix.

19. In a jet engine as recited in claim 18 and further including thrust augmenting means disposed within said exhaust duct.

20. In a jet engine as recited in claim 18 and further including primary flow directing means disposed within said casing proximate said primary exhaust passage for imparting rotary motion concentric with said primary exhaust passage to said stream of primary combustion products.

21. In a jet engine as recited in claim 20 wherein said primary flow directing means includes a plurality of vanes disposed radially about the axis of said casing.

22. In a jet engine as recited in claim 17 and further including primary flow directing means forming tangentially oriented passageways through said casing for communicating said bypass air with said primary combustion products.

23. In a jet engine as recited in claim 17 wherein said secondary flow directing means includes means forming tangentially oriented passageways through said casing proximate said exhaust passage for communicating said primary combustion products with said bypass air.

24. In a jet engine as recited in claim 23 and further including primary flow directing means disposed within said casing between said secondary flow directing means and said primary exhaust passage.

25. In a jet engine as recited in claim 24 wherein said primary flow directing means include a plurality of vanes radially disposed about the axis of said casing.

* * * * *